Patented Feb. 25, 1947

2,416,472

UNITED STATES PATENT OFFICE 2,416,472

CAST REFRACTORY PRODUCTS

Theodore Estes Field, Louisville, Ky., assignor to Corhart Refractories Company, Louisville, Ky., a corporation of Delaware No Drawing. Application April 10, 1945,
Serial No. 587,612

8 Claims. (Cl. 106—57)

The tremendous increase in production of magnesium and its alloys has emphasized the unsatisfactory performance of presently available refractories for melting and containing the molten metals. It is an object of this invention to disclose a novel heat cast refractory which has proven to be especially serviceable for such uses. By heat cast is meant the complete melting of the ingredients as for example with the techniques disclosed in U. S. Patent #1,615,750 to Fulcher, and shaping into the desired form by casting into molds and solidifying.

Heat cast refractories of this disclosure consist of well developed interlocking crystal phases with an amorphous matrix of much lower softening point which takes the place of both the fluxing bond and the porosity of the usual burnt refractory. Magnesium is an extremely reactive metal and I have found the elimination of porosity a distinct advantage since it confines the attack to the outside surface alone. Penetration and reaction inside the refractory is particularly destructive since it is apt to take place with an increase in volume. I have found that the heat cast refractory, particularly of more than one crystal phase, has another distinct advantage in that the crystals interlock to give a skeleton network which is strongly coherent in itself and is not dependent upon a fluxing bond to hold it together. Thus even though the amorphous matrix is the weakest link in resistance to attack by the magnesium, its eventual dissolution does not cause sloughing off of liberated crystals as with burnt refractories.

The chemical attack by magnesium results from reduction of the oxides of the refractory to metal and simultaneous oxidation of the magnesium to magnesium oxide. Refractory oxides with the exception of magnesium oxide itself are all subject to such attack. I have discovered however that well developed crystals of $ZrO_2$ and of $Al_2O_3$ which can be produced in a heat cast refractory are relatively slowly attacked despite the ready reducibility of these oxides reported in the literature. Since magnesium oxide is theoretically not reduced at all however, I prefer to use the $Al_2O_3$ in combination with MgO as spinel ($Al_2O_3$/MgO is 2.54) which I have found can be done without raising the melting point excessively. In its broadest aspects therefore, my novel heat cast refractory contains well developed $ZrO_2$ and $MgO.Al_2O_3$ crystals with or without additional corundum crystals.

I have found that the addition of $ZrO_3$ to spinel materially increases the ease of melting and casting. Thus while spinel with 5% $SiO_2$ present melts at 2100° C.; I obtained melting at a temperature of 1850° C. with as little as 10% zirconia added and with 31% $ZrO_2$ in melt N given below, the casting temperature was reduced to 1770° C. This is in contrast to the addition of $Al_2O_3$ to spinel where a 31% substitution still gives a melting temperature of 2060° C. in the presence of 5% $SiO_2$. I have also found that the tendency of castings containing MgO to show internal gas pockets is greatly reduced as $ZrO_2$ is increased, possibly because of the decreased temperature of casting.

To preserve the benefit of an interlocking crystal network of at least two phases, and to keep the melting points within commercial limits I prefer to keep $ZrO_2$ between 10 and 60%, MgO between 7 and 25% and $Al_2O_3$ between 30 and 80%. Examples of such compositions which I have made by melting pure oxides are shown in Table I.

Table I

| Melt | Chemical compositions | | | Calculated phases | | |
|---|---|---|---|---|---|---|
| | $ZrO_2$ | MgO | $Al_2O_3$ | Spinel | Corundum | $ZrO_2$ |
| A | 20 | 10 | 70 | 35 | 45 | 20 |
| B | 30 | 20 | 50 | 70 | 0 | 30 |
| C | 30 | 10 | 60 | 35 | 35 | 30 |
| D | 40 | 17 | 43 | 60 | 0 | 40 |
| E | 40 | 10 | 50 | 35 | 25 | 40 |
| F | 50 | 10 | 40 | 35 | 15 | 50 |
| G | 60 | 10 | 30 | 35 | 5 | 60 |

Pure $ZrO_2$ is very expensive at present and I therefore prefer (for commercial refractories) to make use of a high grade baddeleyite ore as source of $ZrO_2$, the primary impurities being a small amount of $SiO_2$ and some iron oxide which is largely reduced out by the carbon electrodes during melting of the batch. Calcined magnesite may be used as source of MgO and I prefer to supply $Al_2O_3$ as the refined product used in electrolytic manufacture of aluminum although it is within the claims of this invention to use less refined materials such as high grade bauxite or aluminous byproducts.

When the cheaper commercial materials are used, the various impurities concentrate in the amorphous matrix. Tests have shown that the $SiO_2$ in such matrices is readily reduced by the molten magnesium and it is therefore highly desirable to keep this ingredient low by using high grade raw materials. The inclusion of 5% $SiO_2$ is permissible but a decrease in resistance is observable with 10% $SiO_2$. The cracking of small castings is apt to occur if $SiO_2$ is not kept above 11% but I have found that $SiO_2$ can be safely lowered on larger castings and even small castings can be obtained at low $SiO_2$ if small percentages of $K_2O$ or $Na_2O$ are also included. Examples of batch compositions with commercial raw materials which I have cast into refractory blocks are shown in Table II.

Table II

| Melt | $ZrO_2$ | MgO | $Al_2O_3$ | $SiO_2$ | $Fe_2O_3$ | $TiO_2$ | CaO | $Na_2O$ |
|------|---------|------|-----------|---------|-----------|---------|------|---------|
| H    | 10.0    | 10.0 | 77.7      | 1.3     | 0.6       | 0.2     | 0.2  | 0.0     |
| J    | 10.5    | 10.4 | 69.8      | 9.0     | 0.1       | 0.0     | 0.2  | 0.0     |
| K    | 13.4    | 13.3 | 63.2      | 5.0     | 2.5       | 2.1     | 0.5  | 0.0     |
| L    | 13.9    | 21.0 | 55.8      | 4.5     | 2.3       | 1.9     | 0.6  | 0.0     |
| M    | 20.0    | 20.3 | 51.8      | 4.6     | 1.1       | 0.3     | 0.5  | 1.4     |
| N    | 31.1    | 16.4 | 44.7      | 5.1     | 1.7       | 0.4     | 0.4  | 0.2     |
| O    | 41.9    | 12.8 | 34.6      | 7.5     | 1.1       | 1.6     | 0.5  | 0.0     |
| P    | 53.8    | 10.1 | 30.0      | 3.9     | 0.6       | 0.3     | 0.2  | 1.1     |

Since these compositions are completely melted before casting it is obvious that any raw materials which in combination will yield a desired chemical analysis can be used. In general the materials are selected with view toward minimizing the impurities without adding too greatly to the cost since the purest compositions have the greatest resistance to attack.

By "principally" in the following claims I mean over 95% of the total composition.

What I claim is:

1. A heat cast refractory containing magnesium spinel composed of zirconia, magnesia and alumina in which the zirconia is between 10% and 60%, the magnesia is over 7% and the ratio of alumina to magnesia is over 2.5 by weight, the total of said ingredients being at least 95%.

2. A heat cast refractory containing magnesium spinel composed principally of zirconia, magnesia and alumina in which the ratio of alumina to magnesia is over 2.5 by weight and in which $ZrO_2$ lies between 10% and 60%, MgO between 7% and 25% and $Al_2O_3$ between 30% and 80% by chemical analysis.

3. A heat cast refractory composed principally of crystalline zirconia and magnesium spinel in an amorphous matrix and in which the $ZrO_2$ lies between 10% and 60% by chemical analysis.

4. A heat cast refractory composed principally of crystalline zirconia, magnesium spinel and corundum in an amorphous matrix and in which the $ZrO_2$ lies between 10% and 60% by chemical analysis.

5. A heat cast refractory composed principally of zirconia, magnesia, alumina and silica in which the zirconia is between 10% and 60% the magnesia is over 7%, the silica is under 10% and the ratio of alumina to magnesia is over 2.5 by weight.

6. A heat cast refractory composed principally of zirconia, magnesia, alumina and silica in which the ratio of alumina to magnesia is over 2.5 by weight and in which $ZrO_2$ lies between 10% and 60%, MgO between 7% and 25%, $Al_2O_3$ between 30% and 80% and $SiO_2$ between 0% and 10% by chemical analysis.

7. A heat cast refractory composed principally of crystalline zirconia and magnesium spinel in a siliceous matrix and in which the $ZrO_2$ lies between 10% and 60% and the $SiO_2$ is less than 10% by chemical analysis.

8. A heat cast refractory composed principally of crystalline zirconia, magnesium spinel and corundum in a siliceous matrix and in which the $ZrO_2$ lies between 10% and 60% and the $SiO_2$ is less than 10% by chemical analysis.

THEODORE ESTES FIELD.

REFERENCES CITED

The following references are of record in the file of this patent:

UNITED STATES PATENTS

| Number    | Name          | Date          |
|-----------|---------------|---------------|
| 2,271,366 | Field         | Jan. 27, 1942 |
| 2,271,369 | Fulcher et al.| Jan. 27, 1942 |